United States Patent [19]

Hayakawa et al.

[11] Patent Number: 5,047,086

[45] Date of Patent: Sep. 10, 1991

[54] CEMENT COMPOSITION FOR EXTRUSION

[75] Inventors: Kazuhisa Hayakawa; Tohru Chiba; Shin-Ichiro Nakamura, all of Joetsu, Japan

[73] Assignee: Shin-Etsu Chemical Co., Ltd., Tokyo, Japan

[21] Appl. No.: 344,600

[22] Filed: Apr. 28, 1989

[30] Foreign Application Priority Data

May 6, 1988 [JP] Japan .................. 63-109961

[51] Int. Cl.$^5$ .................. C04B 16/02; C04B 16/06
[52] U.S. Cl. .................. 106/731; 106/737; 106/797
[58] Field of Search .................. 524/43; 106/118, 119, 106/120, 89, 93, 108, 731, 737, 797

[56] References Cited

U.S. PATENT DOCUMENTS

| 3,390,003 | 6/1968 | Cooper . | |
|---|---|---|---|
| 4,118,241 | 10/1978 | Bernett | 106/93 |
| 4,218,258 | 9/1989 | Rothberg | 524/43 |
| 4,560,413 | 12/1985 | Takagi et al. | 106/118 |

FOREIGN PATENT DOCUMENTS

| 0263723 | 4/1988 | European Pat. Off. . |
| 3611080 | 1/1987 | Fed. Rep. of Germany . |
| 3601733 | 5/1987 | Fed. Rep. of Germany . |
| 0236917 | 6/1986 | German Democratic Rep. . |
| 0240193 | 10/1986 | German Democratic Rep. . |
| 0242219 | 1/1987 | German Democratic Rep. . |
| 713468 | 3/1968 | Japan . |
| 5174880 | 4/1980 | Japan . |
| 61-261247 | 11/1986 | Japan . |
| 62-046941 | 2/1987 | Japan . |
| 62-46941 | 2/1987 | Japan .................. 106/93 |
| 62-246855 | 10/1987 | Japan . |
| 127688 | 1/1988 | Japan . |
| 1180227 | 2/1970 | United Kingdom . |

OTHER PUBLICATIONS

Chemical Abstracts, vol. 111, No. 8, Columbus, Ohio, U.S.A., ref. No. 63067Y.
World Patent Index Latest, Accession No. 87-232363, Week 33, Derwent Publications Ltd, London GB.

Primary Examiner—William R. Dixon, Jr.
Assistant Examiner—Paul Marcantoni
Attorney, Agent, or Firm—Parkhurst, Wendel & Rossi

[57] ABSTRACT

A cement composition for extrusion which is produced by incorporating, into cement mortar, 3 to 15 weight % of crushed pulp fiber, 0.2 to 1 weight % of at least one member selected from an alkylcellulose and a hydroxyalkylalkylcellulose, and a 2% water solution having a viscosity of 80,000 cps or more allows for reduced production costs by reducing the loads of the binder material using a pulp fiber without carcinogenicitic asbestos fiber. Furthermore, it allows for excellent extrudability and provides the moldings with workability such as nailing and sawing.

6 Claims, No Drawings

CEMENT COMPOSITION FOR EXTRUSION

BACKGROUND OF THE INVENTION

The present invention relates to cement compositions for extrusion and, more specifically, to those cement compositions for extrusion which contain pulp fiber. These cement compositions for extrusion provide excellent moldability and workability using binders in quantities that are equivalent to or less than is conventional.

Asbestos fiber reinforced cement boards or plates have so far been widely used as materials for outer walls, roofs, floors of buildings and so forth. The cement boards or plates may be obtained by adding water to a mixture of cement on one hand and asbestos fiber and aggregates, etc. on the other on the order of 20 weight %, then kneading and extruding the entire mixture into a form by means of required dies. The asbestos fiber thus used is characterized by an excellent dispersing quality when kneading, and the kneaded materials obtained have a good shape and water retention when extruded. Further, the heat resistance of the asbestos fiber displays to the fullest extent its performance as reinforcing fiber in the curing by a steam autoclave at 170° C. or a higher temperature to furnish the extruded materials with dimensional stability and required strength. Since the asbestos fiber is an unrivaled reinforcing fiber which satisfies, at the same time, the dispersing quality, shape retention, water retention and thermal resistance required when extruding, they have thus far been used exclusively for extrusion.

In recent years, however, the asbestos fiber has become a social problem because of its carcinogenicity which is believed to be derived from the fibrous shape peculiar thereto. Therefore in an extrusion such as above asbestos is not longer used.

As a substitute for the asbestos fiber, some synthetic fibers were considered which, however, are poor in dispersing quality, shape and water retention. Furthermore, these organic fibers for the most part do not have good heat resistance, some being unable to be cured by the foregoing steam autoclave. The general trend is that the more excellent the reinforcing effect the more expensive such fibers are as compared with the asbestos fiber. With this as background, we are now in such a situation where really satisfying materials cannot be found as substitutes for asbestos fiber.

On the other hand, the pulp fiber, which is one of the organic but natural fibers, is less expensive and better than other organic fibers, though it has an inferior dispersing quality compared to the asbestos fiber. The extruded materials to which a certain quantity of this fiber has been added are advantageous in it that they allow for such processing as nailing and sawing which could not be easily done on the conventional cement moldings containing asbestos fiber. A feature thereof facilitates to mount them as facing materials of buildings. They are now attracting a good deal of public attention as substitute materials for the conventional asbestos fibers.

In the extrusion process of cement mortar compositions, much pressure is in general applied thereonto when molding them. For this reason, such water retention characteristics that the asbestos or pulp fibers in the cement compositions have are not sufficient to hold water uniformly in the moldings. Since in this case the compositions are made to adhere to each other with the water separated before the extruded moldings are set and solidified, it was difficult to maintain the moldings discharged from these dies in form. It has been proposed to use organic type binders in the compositions for extrusion molding in order to improve their moldability. For example the Japanese Patent Publication No. 43-7134 discloses a technology by which binders such as methylcellulose and hydroxypropyl methylcellulose can be used as cement compositions containing an asbestos fiber for extrusion moldings. This method is generally adopted in use of binders. As such binders, in addition to the methylcellulose and hydroxypropylmethylcellulose disclosed in said publication include; hydroxyethylcellulose, carboxymethyl hydroxyethylcellulose, polyethylene oxide, sodium polyacrylate, casein and so forth. Among those, the alkylcellulose and/or hydroxyalkylalkylcellulose, which are excellent in dispersing quality, water retention and tackiness, have been widely utilized in cement and aggregates.

So far several propositions have been offered for compositions containing the pulp fiber for molding to which such binders as above were added. In the Japanese Patent Provisional Publication No. 55-51748, for example, a composition has been disclosed comprising a glass fiber to which a small quantity of pulp (cellulose) fiber and a binder such as methylcellulose have been added. Another Japanese Patent Publication, No. 63-1276, discloses that a molding allowing for riveting and sawing can be obtained by extruding a cement composition to which a pulp (cellulose) fiber is added, one-shot foamed spherical resin and such binders as methylcellulose.

It should be noted, however, that the use, as a binder, of such alkylcellulose and/or hydroxyalkylalkylcellulose similar to those used in conventional cement containing asbestos fiber to be added to the compositions having pulp fiber, is problematical in that it requires more loadings than is conventional to obtain a regular and smooth extrusion molding.

In the extrusion molding of the conventional cement compositions containing asbestos fiber, the cost ratio of required binder or binders to the total cost of the extruded molding is on the order of one fourth to one half. This implies that increased loads of binders will raise the total cost of materials to be molded, which places a high hurdle to the extrusion molding of the cement compositions containing the pulp fiber.

With this as a background it has been strongly desired to have such binders which allow for an excellent moldability by adding only small loadings equivalent to or less than the conventional ones in the extrusion molding of cement compositions containing the pulp fiber.

SUMMARY OF THE INVENTION

As a result of our researches to control such disadvantages, we have accomplished this invention of cement compositions containing pulp fiber for extrusion molding that are excellent in moldability and workability.

The pulp fiber to be used in cement containing the pulp fiber according to this invention has a particular range of diameter and length. As a binder we use the alkylcellulose and/or hydroxyalkylalkylcellulose, the 2% water solution of which has 80,000 cps or more, measured at 20° C. by a No. JIS Ubbelohde viscometer. This binder requires only the quantity equivalent to or less than that of the conventional alkylcellulose and/or hydroxyalkylalkylcellulose of which a 2% water solution has a viscosity of 12,000 to 40,000 cps of viscosity measured at 20° C. by the No. 5 JIS Ubbelohde viscometer, that was used in the conventional cement compositions containing asbestos fiber. The binder used in this invention has better extrusion moldability than is conventional by adding only 0.2 to 1 weight % of the cement composition for extrusion molding as a whole.

Further moldings containing the pulp fiber by this invention remarkably improves such workability as nailing and sawing with the conventional ones.

DETAILED EXPLANATION OF THE INVENTION

The subject matter of the present invention is a cement composition for extrusion which is produced by incorporating, into cement mortar, 3 to 15 weight % of crushed pulp fiber being 5 to 20 microns in diameter and 1 to 10 mm in length, 0.2 to 1 weight % of the alkylcellulose and/or hydroxyalkylalkylcelluose, and 2% water solution having 80,000 cps or more viscosity measured at 20° C. by a No. 5 JIS Ubelohde viscometer.

The alkylcellulose and/or hydroxyalkylalkylcellulose to be used as a binder for extrusion molding accoording to this invention have, in their 2% water solution, a viscosity of 80,000 or more cps when measured at 20° C. by means of the No. 5 JIS Ubbelohde viscometer. The following are, although not all-inclusive, examples of the alkylcellulose and/or hydroxyalkylalkylcellulose that can be used; methylcellulose, hydroxypropylmethylcellulose, hydroxyethylmethylcellulose, hydroxyethylethylcellulose, and ethylcellulose.

Their loads, which depend upon the quantity and dispersing quality of the pulp fibers used, are to be within 0.2 to 1 weight % of the cement compositions as a whole. These loadings permit the moldability and workability intended by this invention to display their effect to the fullest extent. Surpassing this weight percentage of 1% will lead only to a cost increase without allowing any more effects. If the same percentage is less than 0.2 weight %, the extrusion molding will be impossible even with the addition in small quantity of any pulp fiber having a good dispersing quality.

The raw material used for the pulp fiber will be either a chemical pulp from which the lignin in its lignified tissue has been chemically removed by means of sulfite method or nitrate method, or a mechanical pulp obtained by a treatment such as the pulp grinding of wood. The pulp sheet or chip as a raw material is suitably crushed with an impact type or crusher type grinder and then screened into 5 to 20 microns in fiber diameter and 1 to 10 mm in length through a sieve before use. Mechanical pulp is preferably used as a pulp material due to its lower cost, but chemical pulp may also be used in this invention.

The loads of the pulp fiber as above should range from 3 to 15 weight percent. If the diameter and the length of the pulp fiber are smaller than the foregoing limits or if, even though these limits are cleared, the loadings are inferior to 3 weight %, the intrinsic reinforcing effect of the pulp fiber cannot be displayed. Even if the pulp fiber as such is added, it is disadvantageous not only in its poor shape retention when molded, but also in improved workability such as nailing and sawing which cannot be expected in the products after curings. It should be noticed, on the other hand, that if the diameter and length of the pulp fiber exceed the limits or if the loadings are excessive, the pulp fiber will have a poor dispersing quality, which will be an obstacle to good molding, and consequently, to good extrusion moldings with good surface smoothness. Moreover, the worsened heat resistance prevents it to be used in practice.

The chief material of the cement composition according to this invention is composed of known cements, aggregates, water and additives. In addition to the ordinary Portland cement, we can use such special cements as alumina cement. As aggregates, we can use not merely perlite, vermiculite, flyash and other lightweight aggregates usually employed in cement mortar, but also quartz sand composed of silica, quartz sand No. 5 to No. 12 and/or quartz rock, silica material and silica fume of a grain size equal to or less than that of cement.

The present invention allows for decreased production cost by reducing the loads of binder down to 0.2 to 1 weight percent of the material using a pulp fiber without carcinogenicitic asbestos fiber. Furthermore, it assures an excellent extrudability and provides the moldings with such workability as nailing and sawing.

In the following examples of the present invention and comparative examples are described preferred embodiments to illustrate the invention. It is, however, to be understood that the invention is not intended to be limited to the specific embodiments.

EXAMPLES 1-6 AND COMPARATIVE EXAMPLES 1-7

The components as below were prepared in quantities such as indicated in Table 1 and Table 2 attached hereto and then kneaded with a double arm kneader. They were then extruded into sheets 75 mm in width and 6 mm in thickness by means of a vacuum extruder Y-22 of Ishikawatoki-Ji K.K. made. Their moldability was compared by the following testing method. The results thereof are indicated also in Table 1 and Table 2, respectively, form hereafter.

(Components)

Cement: Asano-made normal Portland cement.

Quartz rock: Touane-Sha made, class A, crushed, No. 30, (mean grain size: 9-12 microns).

Pulp fiber I:

A pulp sheet 2 mm in thickness and 80% or more in cellulose content was made from conifer from which lignin in lignified tissue had been removed by a sulfite process. This sheet was then cut into a 5 mm×5 mm square of chips, which were then crushed first with a crusher type grinder "Victory Mill VP-1" (brand name, Hosokawa Micron K.K.) then with a compact type vibrating mill "B-3 type" (brand name, Chuoh Kakohki K.K.) for 0.5 hour. The crushed materials were screened with a 4-mesh sieve for industrial use into grains of 8 to 15 microns in diameter and 1 to 3 mm in length.

Pulp fiber II:

After grinding the cut pieces of the pulp sheet as under I above with the crusher type ginder "Victory Mill VP-1" (Hosokawa Micron K.K. made), they were screened by means of an industrial 4-mesh sieve. The pulp fiber II contains many fibers that are oversize (20 microns or more in diameter and 10 mm or more in length).

Pulp fiber III:

After further grinding the pulp fiber I for 2 hours with the compact type vibrating mill "B-3 type" (brand name, Chuoh Kakohki K.K.), it was screened into a fiber 5 microns or less in diameter and 1 mm or less in length using a 42-mesh industrial sieve.

Hydroxypropylmethylcellulose:
90SH type of the Shin-Etsu Chemical Co., Ltd. made.
Hydroxyethylmethylcellulose:
SEB type made by the same company.
Methylcellulose:
SM type made by the same.

(Testing Method)

Viscosity:
2% water solution of each cellulose ether was measured with No. 5 JIS Ubbelohde viscometer at 20° C.

Moldability:
Materials were processed by a vacuum extruder Y-22 (of Ishikawatoki-Ji K.K.) provided with a die 6 mm in thickness and 75 mm in width. Moldings delivered with the same cross section as that of the die were considered "good" and those delivered with both ends cut off were designated "bad".

Surface condition:
Those with an uneven surface with pulp projected were designated as "bad".

Nailing characteristic:
Extruded moldings were cured first at 65° C. under saturated steam and then at 180° C. in an autoclave. The moldings thus cured were then nailed with nails 3 mm in diameter. Those without cracks were designated "good", and those with cracks "bad".

TABLE 1

| | Examples | | | | |
|---|---|---|---|---|---|
| | 1 | 2 | 3 | 4 | 5 |
| (Components; weight %) | | | | | |
| Cement | 50 | 50 | 50 | 50 | 50 |
| Quartz rock | 20.8 | 10.5 | 16.6 | 16.1 | 16.5 |
| Pulp fiber I | 3 | 15 | 8 | 8 | 8 |
| Pulp fiber II | | | | | |
| Pulp fiber III | 1 | | | | |
| Hydroxypropylmethylcellulose: | | | | | |
| Viscosity; 15,000 cps | | | | | |
| 70,000 cps | | | | | |
| 80,000 cps | 0.2 | | | | |
| 100,000 cps | | 0.5 | | | |
| 180,000 cps | | | 0.6 | | |
| Hydroxyethylmethylcellulose: | | | | | |
| Viscosity; 100,000 cps | | | | 0.9 | |
| Methylcellulose: | | | | | |
| Viscosity; 80,000 cps | | | | | 0.5 |
| Water | 26 | 24 | 25 | 25 | 25 |
| (Test Results) | | | | | |
| Mold ability | good | good | good | good | good |
| Surface condition | good | good | good | good | good |
| Nailing characteristic | good | good | good | good | good |

TABLE 2

| | Comparative Examples | | | | | | |
|---|---|---|---|---|---|---|---|
| | 1 | 2 | 3 | 4 | 5 | 6 | 7 |
| (Components; weight %) | | | | | | | |
| Cement | 50 | 50 | 50 | 50 | 50 | 50 | 50 |
| Quartz rock | 16 | 16 | 16 | 5.1 | 23.7 | 16.5 | 16.5 |
| Pulp fiber I | 6 | 8 | 8 | 17 | 2 | | |
| Pulp fiber II | | | | | | 8 | |
| Pulp fiber III A | | | | | | | 8 |
| Hydroxypropylmethylcellulose: | | | | | | | |
| Viscosity; 15,000 cps | 1.0 | | | | | | |
| 70,000 cps | | 1.0 | | | | | |
| 80,000 cps | | | 1.0 | | 0.3 | | |
| 100,000 cps | | | | 0.9 | | 0.5 | |
| 180,000 cps | | | | | | | 0.5 |
| Hydroxyethylmethylcellulose: | | | | | | | |
| Viscosity; 100,000 cps | | | | | | | |
| Methylcellulose: | | | | | | | |
| Viscosity; 80,000 cps | | | | | 0.5 | | |
| Water | 27 | 27 | 27 | 27 | 24 | 25 | 25 |
| (Test Results) | | | | | | | |
| Mold ability | bad | bad | bad | bad | good | bad | good |
| Surface condition | good | good | good | bad | good | bad | good |
| Nailing characteristic | good | good | bad | good | bad | good | bad |

What is claimed is:

1. A cement composition for extrusion, consisting of 60-75 wt % cement mortar including about 50 wt % of cements and 16-21 wt % of aggregates, 3-15 wt % crushed pulp fiber and 0.2-1 wt % of at least one member selected from the group consisting of alkylcellulose and hydroxyalkylalkylcellulose in a 2% aqueous solution having a viscosity of 80,000 cps or more at 20° C.

2. A cement composition for extrusion according to claim 1 wherein the crushed pulp fiber is 5 to 20 microns in diameter and 1 to 10 mm in length.

3. A cement composition for extrusion according to claim 1 wherein the alkylcellulose is at least one member selected from the group consisting of methylcellulose and ethylcellulose.

4. A cement composition for extrusion according to claim 1 wherein the hydroxyalkylalkylcellulose is at least one member selected from the group consisting of hydroxypropylmethylcellulose, hydroxyethylmethylcellulose, and hydroxyethylethylcellulose.

5. A cement composition for extrusion according to claim 1, wherein the cement composition is free of inorganic fibers.

6. A cement composition for extrusion according to claim 1, wherein moldings produced from the cement composition have suitable workability so as to enable nailing and sawing thereof.

* * * * *